(12) United States Patent
Bliss et al.

(10) Patent No.: US 8,814,523 B2
(45) Date of Patent: Aug. 26, 2014

(54) HYDROFORMED TURBINE BLADE

(75) Inventors: Martin L. Bliss, Thorndale (CA);
Trevor M. Clark, Appin (CA); Jose U. Coelho, Lucan (CA); Timothy R. Flint, Strathroy (CA); Blair J. Longhouse, Otterville (CA)

(73) Assignee: Vari-Form, Inc., Strathroy, Ontario (CA)

( * ) Notice: Subject to any disclaimer, the term of this patent is extended or adjusted under 35 U.S.C. 154(b) by 797 days.

(21) Appl. No.: 13/029,958

(22) Filed: Feb. 17, 2011

(65) Prior Publication Data
US 2011/0211964 A1    Sep. 1, 2011

Related U.S. Application Data

(60) Provisional application No. 61/309,229, filed on Mar. 1, 2010.

(51) Int. Cl.
*B21D 26/033*  (2011.01)
*F03D 1/06*  (2006.01)
*B21D 53/78*  (2006.01)
*F04D 29/38*  (2006.01)

(52) U.S. Cl.
CPC .............. *B21D 53/78* (2013.01); *B21D 26/033* (2013.01); *F03D 1/0658* (2013.01); *F04D 29/388* (2013.01); *Y02E 10/721* (2013.01)
USPC ........ 416/210 R; 416/232; 416/238; 29/889.7

(58) Field of Classification Search
USPC .......... 416/210 R, 226, 223 R, 232, 239, 238, 416/244 A, 235, 236 R; 29/421.1, 61, 889.7, 29/889.72
See application file for complete search history.

(56) References Cited

U.S. PATENT DOCUMENTS

| | | | | |
|---|---|---|---|---|
| 4,260,332 A | * | 4/1981 | Weingart et al. | 416/226 |
| 4,594,761 A | * | 6/1986 | Murphy et al. | 29/889.71 |
| 6,941,786 B1 | | 9/2005 | Cooper et al. | |

FOREIGN PATENT DOCUMENTS

| | | |
|---|---|---|
| GB | 417045 | 9/1934 |
| GB | 659344 | 10/1951 |
| JP | 57191496 | 11/1982 |

OTHER PUBLICATIONS

European Search Report, Jul. 29, 2011 (7 pages).

* cited by examiner

*Primary Examiner* — Edward Look
*Assistant Examiner* — Maxime Adjagbe
(74) *Attorney, Agent, or Firm* — Reising Ethington P.C.

(57) ABSTRACT

In at least one implementation, a method of making a turbine blade may include providing a preform having a hollow cross-section, hydroforming the preform to form a turbine blade body comprising a shell that includes a continuous hollow portion along its interior, and providing a mounting portion attached to the body to mount the turbine blade to a hub. In one or more implementations of the method, the mounting portion may be provided during the step of hydroforming the preform and the mounting portion may be formed from the same preform as the turbine blade body.

21 Claims, 7 Drawing Sheets

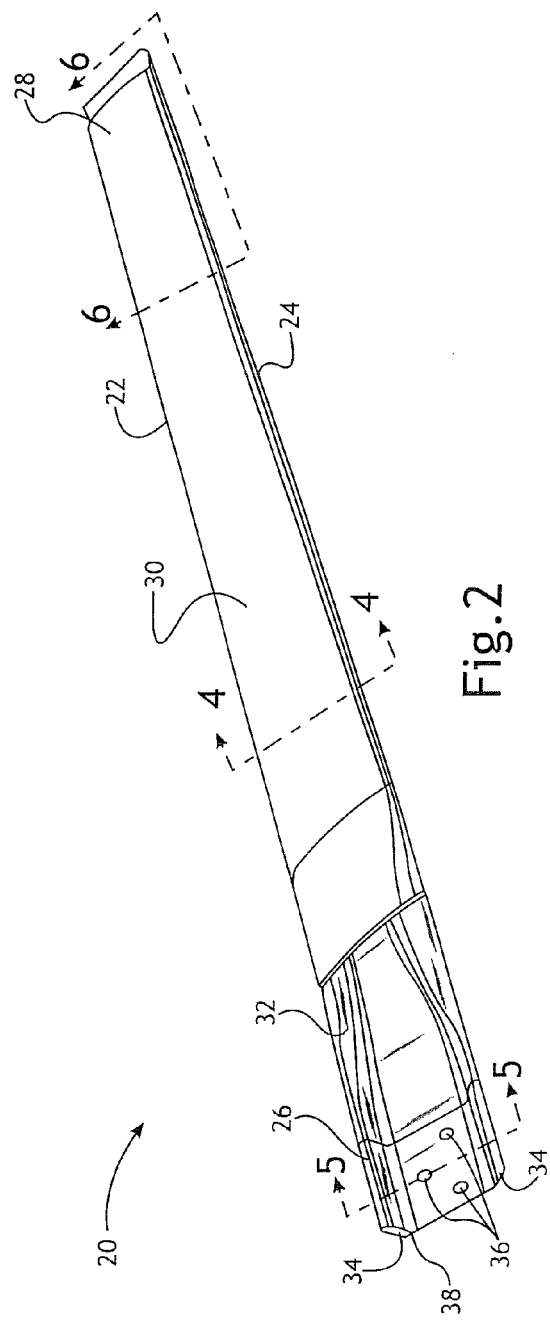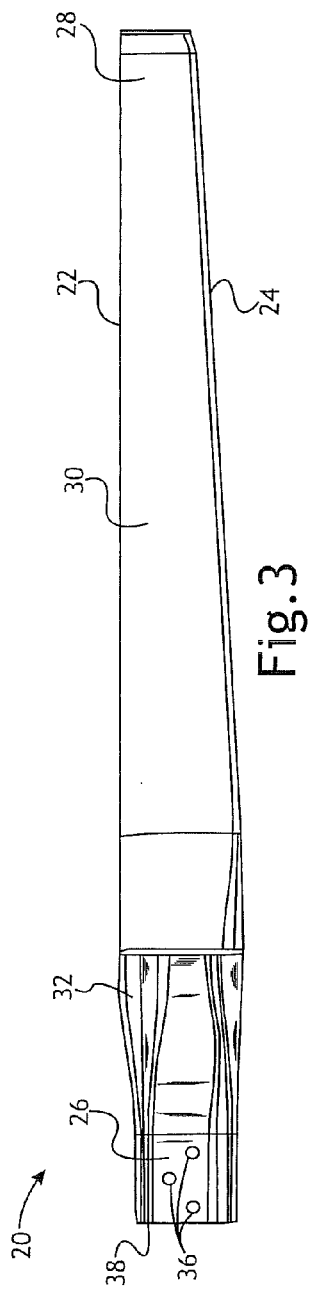

US 8,814,523 B2

HYDROFORMED TURBINE BLADE

REFERENCE TO CO-PENDING APPLICATION

This application claims the benefit of, and incorporates by reference in its entirety, U.S. Provisional Ser. No. 61/309,229 filed Mar. 1, 2010.

TECHNICAL FIELD

The present disclosure relates generally to turbine blades and more particularly to hydroformed turbine blades.

BACKGROUND

Power generating wind turbines have recently emerged as popular devices to capture and facilitate storing energy from the earth's atmosphere. More specifically, wind turbines can convert the kinetic energy of atmospheric fluids (i.e., wind) into other forms of energy. Typically, a wind turbine converts translational kinetic energy from wind to rotational kinetic energy by causing wind to move across various surfaces of a series of turbine blades that are attached to a rotor hub, causing the hub to rotate. The rotating hub can rotate a rotor, including magnets or electromagnets, inside a series of electrically conductive windings, such as a stator, to induce an electrical voltage in the windings. This voltage can be applied to storage batteries or attached to other circuitry to provide a usable power source.

The efficiency and durability of wind turbines depends on, among other things, the construction of its turbine blades. Some of the characteristics of a turbine blade that may affect its performance include size, weight, shape, strength, and blade-to-blade consistency relative to these characteristics, to name a few.

SUMMARY OF THE DISCLOSURE

In at least one implementation, a method of making a turbine blade may include providing a preform having a hollow cross-section, hydroforming the preform to form a turbine blade body comprising a shell that includes a continuous hollow portion along its interior, and providing a mounting portion attached to the body to mount the turbine blade to a hub. In one or more implementations of the method, the mounting portion may be provided during the step of hydroforming the preform and the mounting portion may be formed from the same preform as the turbine blade body.

In at least one implementation, a turbine blade may include a mounting portion, a free end, and a body extending between the mounting portion and the free end. The turbine blade may include a continuous hollow interior along its entire length through the mounting portion, the body, and the free end. The turbine blade body may haves a wall thickness ranging from about 0.5 to about 6 millimeters, and the turbine blade body may be tapered along its length.

BRIEF DESCRIPTION OF THE DRAWINGS

The following detailed description of preferred embodiments and best mode will be set forth with reference to the accompanying drawings, in which:

FIG. 2 is a perspective view of an exemplary turbine blade;

FIG. 3 is a plan view of the turbine blade of FIG. 2;

DETAILED DESCRIPTION OF PREFERRED EMBODIMENTS

Figure 1A:
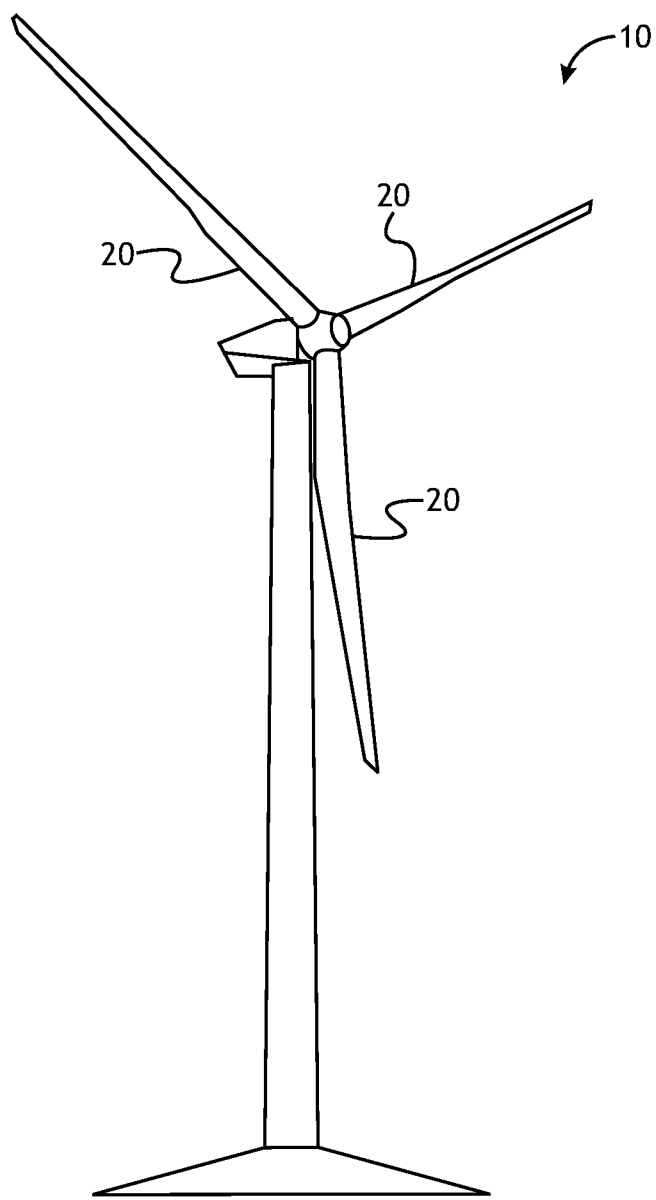
FIGS. 1A and 1B are perspective views of exemplary wind turbines including blades.
Figure 1B:
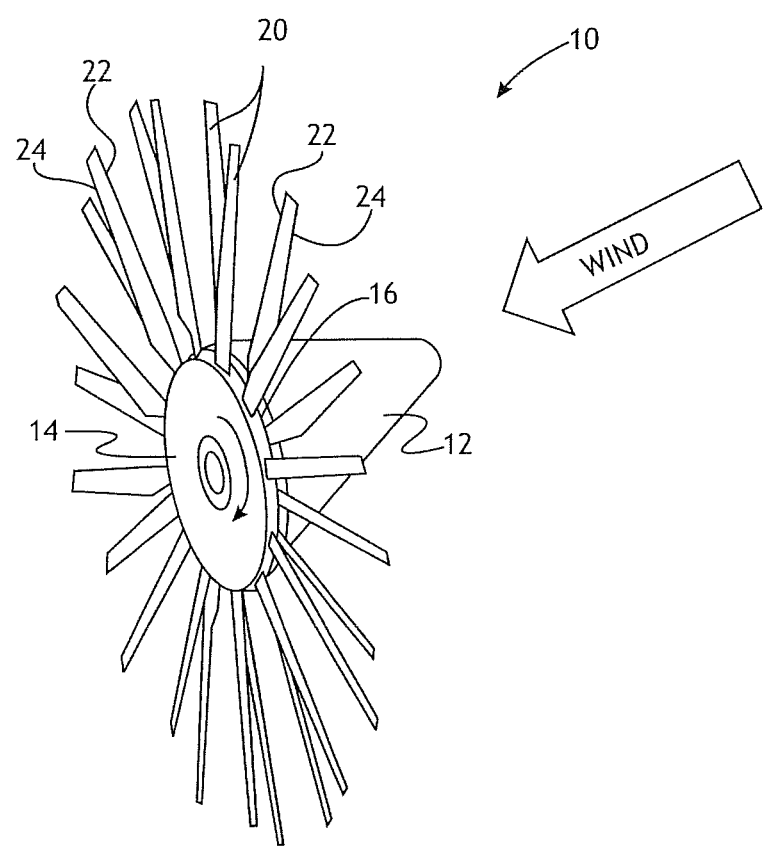

Referring in more detail to the drawings, FIG. 1A shows an exemplary power generating wind turbine 10 of generally conventional configuration with three blades connected to a central hub. Alternatively, the wind turbine may be of the contra-rotating type, as shown in FIG. 1B. That type of wind turbine may include a housing 12, first and second rotating hubs 14, 16, and a plurality of turbine blades 20 attached to the hubs. In this particular example of a wind turbine, the first and second hubs 14, 16 rotate in opposite directions. One of the hubs can be attached to a rotor that includes magnets and/or electromagnets, and the other hub can be attached to electrical windings in the form of a stator that is coaxial with and surrounds the rotor. The rotor and stator are contained within the housing 12 to protect them from the environment. The housing 12 in this example is conical in shape to help guide the apex of the housing directly into the wind for optimum performance of the turbine. Each turbine blade 20 has a leading edge 22 and a trailing edge 24. The orientation in which the turbine blades 20 are mounted to the hubs 14, 16 determines the direction of rotation of each hub. In particular, each turbine blade 20 moves in the direction of its leading edge 22 and causes the hub to which it is attached to rotate accordingly. Or, stated another way, the working fluid moves over the surface of the turbine blade generally in a direction from the leading edge 22 to the trailing edge 24. The turbines in FIGS. 1A and 1B are only two of several possible wind turbine constructions. The turbine blades described herein, and the methods of making them, can be used with all type of turbines including, but not limited to, wind turbines, fans or pumps used to add kinetic energy to air and/or other fluids, and propellers, for example.

Figure 4:
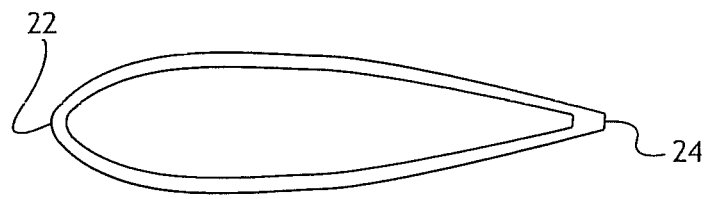
FIG. 4 is a cross-sectional view through the body portion of the turbine blade of FIG. 2.

Referring now to FIGS. 2 and 3, a turbine blade 20 according to one embodiment is shown. The turbine blade 20 includes a mounting portion 26, a free end 28, and a body portion 30 between the two ends. This particular embodiment also includes a transition region 32 between the mounting portion 26 and the body portion 30. The leading and trailing edges 22, 24 of the blade are also shown. The body portion 30 is the main portion of the blade. It is generally an elongate structure having a cross-sectional shape that is designed to cause the blade to move in a desired direction when acted upon by air or other fluids. One example of a suitable cross-sectional shape for the body portion 30 is shown in FIG. 4 as a tear-drop shape, where the leading edge 22 takes the shape of the contoured end of the tear-drop and the trailing edge 24 is formed at the point of the tear-drop. Various other cross-sectional shapes that have airfoil-like characteristics are possible for the body portion 30, and the cross-sectional shape can change along the length of the body portion 30. For example, as is best shown in the plan view of the exemplary turbine blade in FIG. 3, the overall width of the body portion 30 may vary along its length. In this example, the width of the body portion 30 steadily decreases between the transition region 32 and the free end 28, creating a taper along the length of the blade.

The body portion 30 of the blade 20 may be of any length desired, with a presently preferred range of between 1 meter and 5 meters. The body portion 30 may be tapered along its length providing a varying width. The width (chord length), in at least certain implementations may be between about 100 mm and 400 mm. The thickness of the body portion 30 may also vary along the length of the blade. In at least certain implementations, the thickness of the body portion may be between about 10% to 30% of the width (chord length) of the body portion. With the potentially varying thickness and width, a ratio of the outer perimeter of the body portion at or near the mounting portion to an outer perimeter of the body portion at or near the free end 28 may be about 1:1 to 1:5. Typically, the body portion is thicker and wider near the mounting portion than at the free end, although this need not be the case in all designs.

Figure 5:
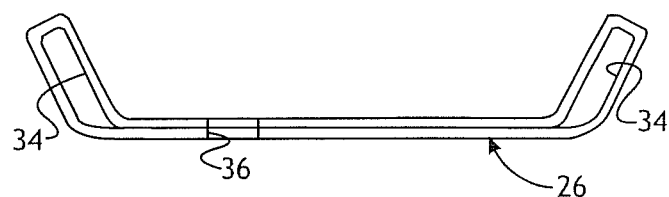
FIG. 5 is a cross-sectional view through the mounting portion of the turbine blade of FIG. 2.

The body portion 30 in this embodiment may be constructed from a hollow shell or skin. The shell is preferably made from a high strength material such as steel having a tensile strength of greater than about 300 MPa, for example. The shell may be made from other materials such as aluminum and its alloys, various grades of stainless steel, and/or other metals. The shell material thickness may be 6 mm or less and may be as low as 0.5 to 1.5 mm in some applications. Of course, material thickness is a function of the type of material used and other design and processing considerations and may vary from these values. For example, a range of 1 mm to 3 mm may be used in an application using aluminum. As indicated in the cross-section in FIG. 5, the wall thickness may be generally uniform, but it is also possible to vary the wall thickness. This combination of a hollow structure and a relatively low material thickness for the body portion of the blade can result in relatively lightweight turbine blades, which can be advantageous to the operation of turbines for multiple reasons. The overall weight of a turbine blade constructed with a hollow shell body portion can be reduced to approximately half of that of the same size turbine blade constructed using conventional fiberglass and/or carbon fiber materials and their compatible manufacturing techniques, particularly where the hollow shell does not include braces, spars, or other internal structural supports.

The mounting portion 26 of the turbine blade is adapted to be attached to the hub of a turbine. It can take various forms, depending on the method of attachment and the shape of the portion of the hub to which it attaches. As illustrated in FIGS. 2 and 3, the mounting portion 26 can be formed as an integral part of the blade from the same material as the body portion 30. In this embodiment, the mounting portion has a generally U-shaped cross-section, illustrated in FIG. 5, with the sides of the U-shape formed as hollow channels 34 and the bottom of the U-shape formed "wall-to-wall" from material corresponding to opposite sides of the tear-drop shape of the body portion 30. The mounting portion 26 may further include one or more apertures 36, as shown, for attaching the turbine blade to the hub using fasteners, for example. The channels 34 are connected to the interior of the body portion 30 through an interior of the transition region 32 such that the entire blade from mounting portion 26 to free end 28 includes an uninterrupted hollow section. Transition region 32 serves to blend the surfaces of the different shapes of the body portion 30 and the mounting portion 26. In some embodiments, no transition region is necessary, such as when the cross-sectional shape of the mounting portion 26 is similar to that of the body portion 30. While in the embodiment shown in FIGS. 2 and 3, the mounting portion 26 is an integral part of the blade by being formed from a single piece of material with the body portion 30, it may also be formed separately from the body portion 30 and/or from a different type of material and secured to the body portion 30 in various manners, such as by welds, adhesives, fasteners, etc.

In some embodiments, the turbine blade also includes a filler material disposed within the hollow shell of the body portion 30, the hollow channels 34 (if present), and/or the interior of any transition region 32. The filler material may be used to provide structural reinforcement to the turbine blade or for other reasons such as vibration control, etc. The filler material may be a low density material such as a polymer-based foam to minimize additional mass. A polyurethane foam is one example of a suitable filler material. Other filler materials that can take the shape of hollow areas may be used, including high density filler materials in applications in which it may be desirable to increase the mass of the turbine blade or to increase the overall strength of the blade.

Figure 6:
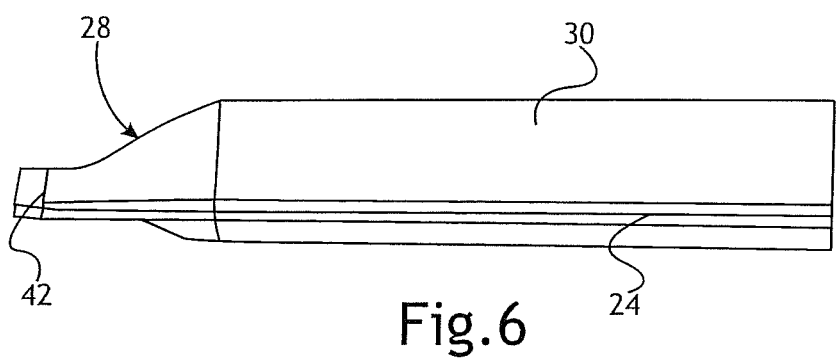
FIG. 6 illustrates the free end of an exemplary turbine blade having a closure that includes a weld.

Both ends of the turbine blade, the free end 28 and an open end 38 of the mounting portion 26, may be left open, or they may include various types of closures, some examples of which will be described in greater detail below. Referring now to FIG. 6, the free end 28 of an exemplary turbine blade is shown in a side view of the trailing edge 24 of the blade. The free end 28 in this embodiment includes a closure 42 that can be formed by pinching the open portion of the free end 28 wall-to-wall and then optionally welding the walls together. The walls may be brought together during one of the forming steps described in further detail below, or as a subsequent step to those processes. The welding process can include laser welding or various other welding, brazing, soldering, or joining processes. The closure 42 may provide a fluid-tight seal at the free end 28.

Figure 7:
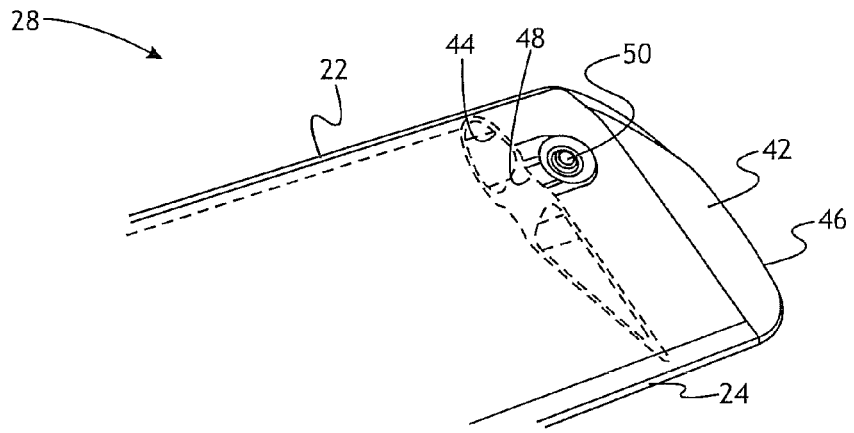
FIG. 7 illustrates the free end of an exemplary turbine blade having a closure secured with a fastener.
Figures 8, 8A:
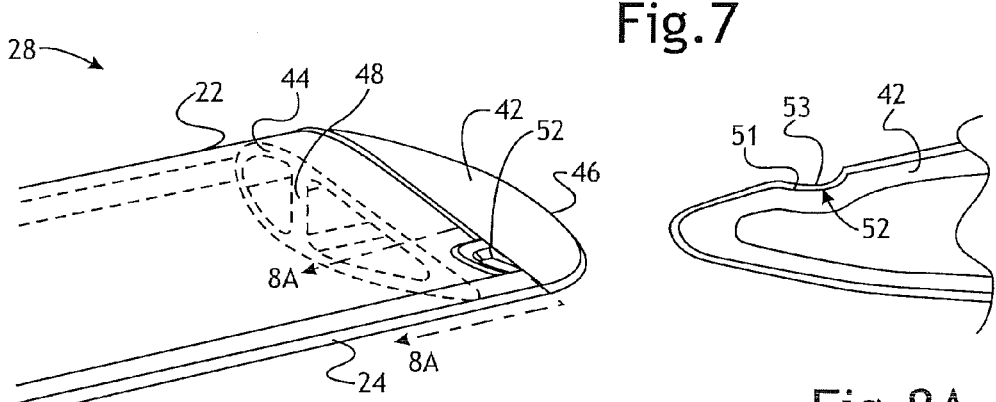
FIG. 8 illustrates the free end of an exemplary turbine blade having a closure secured with an interlock.
FIG. 8A is a cross-sectional view through the closure of FIG. 8.

Referring now to FIGS. 7 and 8, the free end 28 of exemplary turbine blades are shown with other types of closures 42. In both of these examples of closures for the free end 28 of the blade, the closure is shaped at a mating end 44 to conform to the shape of the open free end 28 and tapers to a closed distal end 46. In the example shown in FIG. 7, the closure 42 is generally hollow with a constant wall thickness and includes a cross-member or rib 48 of sufficient thickness to accommodate a fastener 50. The mating end is 44 shaped to closely fit the inside surface of the open free end to seal it against the elements. Fastener 50 passes through the wall thickness of the blade and into rib 48 to secure the closure 42 to the free end of the blade. As shown, the head of the fastener may be recessed below the surface of the blade by providing corresponding recesses in the surface of the blade and in the closure. Such an arrangement of corresponding recesses to accommodate the fastener head can also aid in holding the closure in place prior to the fastener being installed.

FIG. 8 illustrates another example of a closure 42 similar to that of FIG. 7 in that it is also generally hollow with a constant wall thickness and includes a cross-member or rib 48 for structure. The mating end 44 is shaped to closely fit the inside surface of the open free end to seal it against the elements. The closure 42 in FIG. 8 is secured to the free end of the blade with an interlock 52. The interlock 52 includes a recess 51 formed in the outer surface of the closure that corresponds with a mating recess 53 in the free end of the blade. The interlock 52 can be formed after the mating end 44 is fitted to the free end of the blade by way of crimping, or one or both of the recesses that define the interlock 52 may be formed prior to fitting the closure 42 to the free end of the blade. A separate sealing material such as an adhesive or rubber seal can be included about the perimeter of the mating end 44.

The closures 42 described in connection with FIGS. 7 and 8 are preferably constructed from lightweight, weatherable thermoplastic materials by injection molding or other suitable processes, but can also be constructed from a variety of other materials, including various metals, plastics, and/or ceramics or other materials. While the mating end 44 of these exemplary closures is shown and described as fitting inside the open free end 28 of the turbine blade, the mating end 44 can also be configured to fit closely to the outer surface of the free end of the blade or to abut the free end. Additionally, fasteners 50 and interlocks 52 are only two of the many securing techniques that may be used. Other methods of securing the closure 42 to the free end 28 of the blade are possible, including press-fits, snap-fits, welds, adhesives, and others. A closure 42 may also be formed simply by sealing the open free end using a curable adhesive, for example. In embodiments in which a filler material is included in the turbine blade, a closure may not be necessary, or the filler material may be included only at the free end 28 of the blade to form closure 42.

Figure 9:
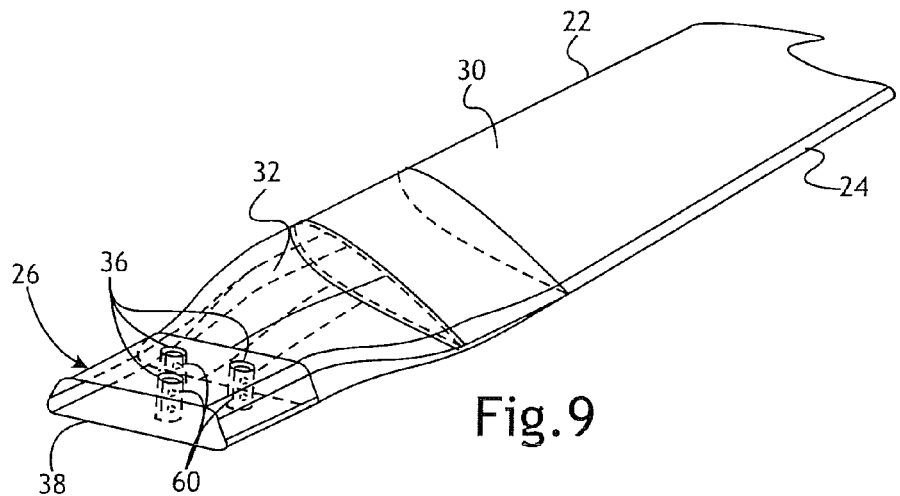
FIG. 9 illustrates the mounting end of an exemplary turbine blade including mounting supports.
Figure 10:
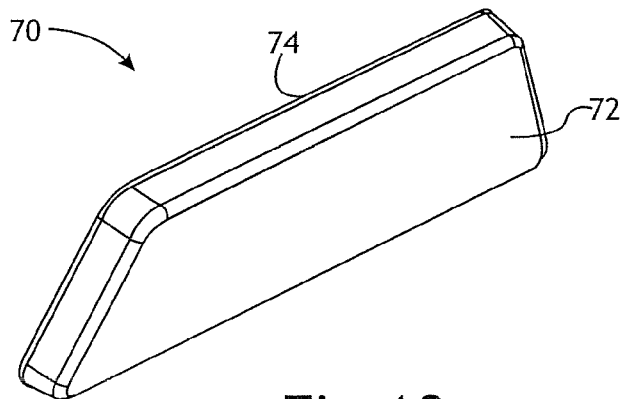
FIG. 10 illustrates an exemplary closure for use with the mounting end in FIG. 9.
Figure 11:
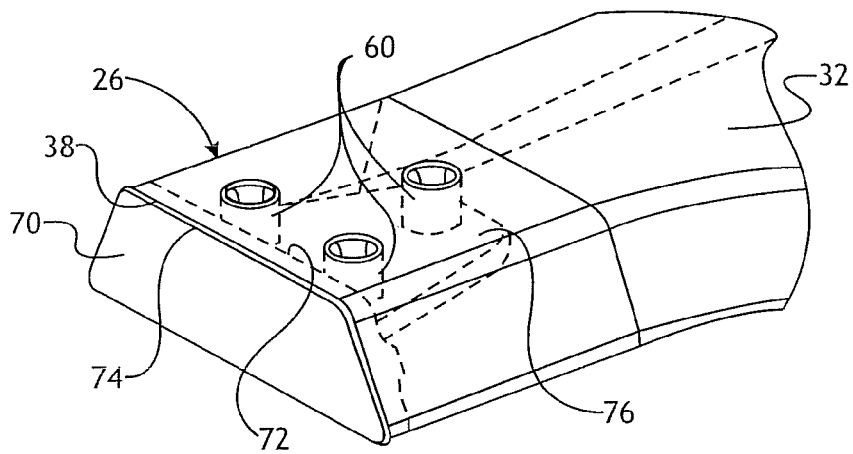
FIG. 11 illustrates the mounting end of an exemplary turbine blade including a closure with integral mounting supports.
Figure 12:
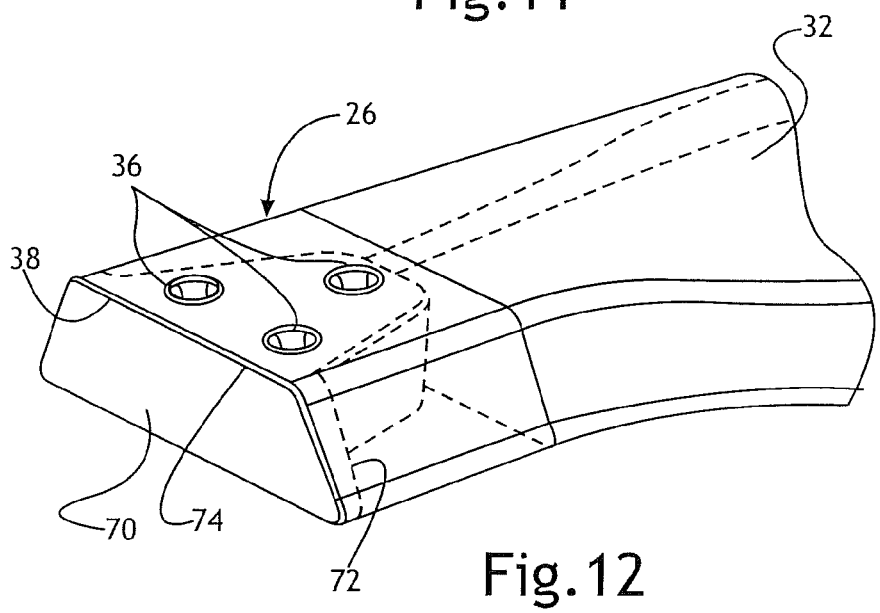
FIG. 12 illustrates the mounting end of an exemplary turbine blade including another type of closure with integral support.

Referring now to FIGS. 9-12, various configurations for the mounting portion 26 of the turbine blade 20 can be described. In these exemplary embodiments, the mounting portion 26 is hollow throughout its cross-section from open end 38 to transition region 32, as illustrated in FIGS. 9, 11, and 12. Each of these embodiments also includes mounting supports 60 in some form to prevent the hollow area from deforming or collapsing under clamping loads applied by fasteners or other attachment members. Each also includes a closure 70 to close off open end 38 of mounting portion 26.

In the embodiment illustrated in FIG. 9, a plurality (three, in this case) of mounting supports 60 are disposed within the hollow interior of mounting portion 26. The mounting supports are structural in nature, designed to accommodate fastener clamping loads used to secure the turbine blade 20 to its corresponding hub. The mounting supports are shown as tubular members, but can be formed in any other suitable shape. The length (or height) of each support 60 corresponds to the distance between the opposing walls of the mounting portion 26 that they are designed to support. Each support 60 is aligned with apertures 36 defined in the opposing walls of the mounting portion 26. Supports 60 are preferably constructed from a high stiffness material such as a metal to support clamping loads for long periods of time, but other materials may be employed such as rigid plastics, ceramics, or other materials. The closure 70 indicated in FIG. 10 can be used to close open end 38 and seal it to protect the interior of the blade from the elements. As with closures 42 described herein for use with the free end 28 of the blade, closure 70 may assume multiple configurations and be attached in various ways to open end 38. In this example, mating end 72 of closure 70 is configured to fit closely with the inside wall of the mounting portion 26 via a press fit, while the opposite end of closure 70 includes a lip 74 to mate with open end 38.

Referring now to FIG. 11, an exemplary closure 70 is shown that includes integral mounting supports 60. In this embodiment, closure 70 includes an extension 76 extending from the mating end 72. The extension 76 is configured to extend into the hollow interior of the mounting portion 26. In this embodiment, the thickness of the extension is less than the length (or height) of the supports 60. Supports 60 are disposed within or carried by the extension 76 at predetermined positions such that when closure 70 is attached to mounting portion 26, the supports 60 are aligned with apertures 36 to accommodate fasteners. The supports 60 may be press-fit into apertures formed through the thickness of the extension 76, or may be disposed within the extension 76 by other methods such as insert molding or casting. The supports 60 may also be molded or otherwise manufactured as one piece with the closure 70.

Referring now to FIG. 12, another exemplary closure is shown that includes integral support. This embodiment is similar to that indicated in FIG. 11, but in this case, the thickness of extension 76 is generally equal to the distance between the opposing walls of the mounting portion 26. This configuration can provide fuller, more equally distributed support for loads applied by fasteners. Due to the opposing walls of the mounting portion being more fully supported in this embodiment, it is possible to eliminate the mounting supports 60 described in connection with FIGS. 9 and 11. Of course, mounting supports 60 can be included with this configuration as well by inserting or including such supports in apertures through the thickness of extension 76 that are aligned with apertures 36 in mounting portion 26.

As with the previously described closures 42 for use with free end 28, the various closures described here for use with mounting portion 26 are preferably constructed at least partially from lightweight, weatherable thermoplastic materials by injection molding or other suitable processes, but can also be constructed from a variety of other materials, including various metals, thermoset plastics, and/or ceramics or other materials. In embodiments, such as that shown in FIG. 12, where mounting supports 60 are omitted, more rigid or filled thermoplastic materials may be utilized to support the clamping loads of fasteners or other attachment members that secure the turbine blade to the hub, as is also the case when an embodiment such as that shown in FIG. 11 is molded or manufactured as a single piece.

Figure 13:
FIG. 13 is a perspective view of an exemplary preform that can be formed to make the turbine blade in FIGS. 2 and 3.

The turbine blade can be formed using various techniques. In an exemplary method, the desired material for the body portion and/or other portions of the turbine blade is provided as a tubular blank having the desired wall thickness and cut to the desired length. The tubular blank is then shaped into a preform 80, an example of which is shown in FIG. 13, that more closely resembles the desired final shape of the turbine blade. Shaping the preform can be accomplished using conventional metal forming techniques such as placing the blank between two die halves that have the desired preform profiles cut into them and bringing the die halves together by moving one or both of them toward the other using a hydraulic press or other type of equipment. The preform may then be formed by a hydroforming process into a shape that may include the final shape of the body portion 30 of the turbine blade. The hydroforming step may also form the final shape of the mounting portion 26 and any transition portion 32 of the turbine blade. When it is desired to form a turbine blade having a tapered blade, such as that shown in FIGS. 2 and 3, there may be excess material at the trailing edge 24 of the blade after the hydroforming step. For example, for illustration purposes only, a line A is drawn in on the preform shown in FIG. 13 that represents where the final trailing edge 24 will be formed. During the hydroforming step, the material is pinched together wall-to-wall along line A (representing the trailing edge 24). After the hydroforming step, the material may be welded, using a laser, for example, and the excess material may be trimmed away using conventional cutting or shearing techniques. The welding and trimming may be done in any order. Other process steps after hydroforming may include cutting the turbine blade to the desired final length, forming apertures in the mounting portion of the blade, disposing support structures at or within the open end of the mounting portion, and/or providing closures for the free end of the blade and/or the open end of the mounting portion. One or more of the recited process steps may be omitted and/or additional process steps may be included.

Figure 14:
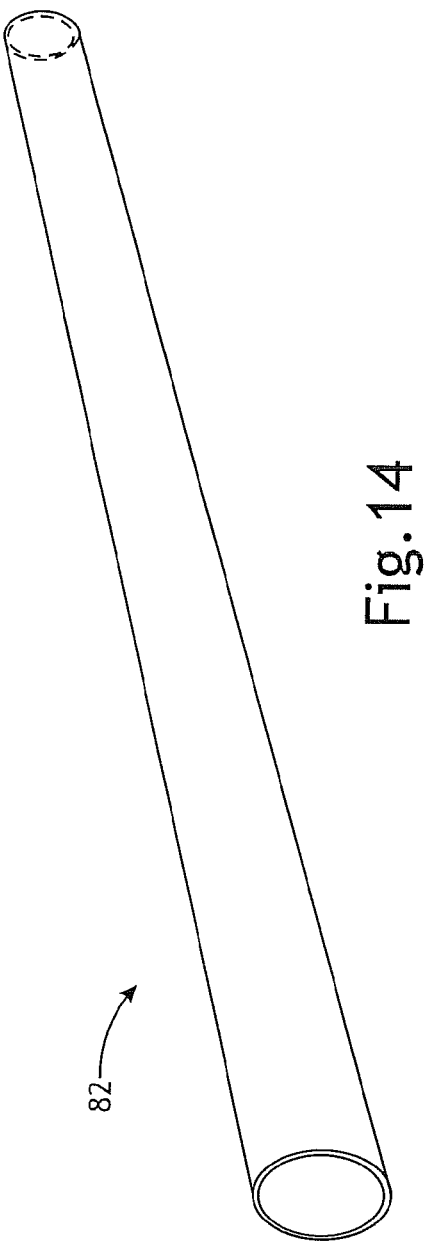
FIG. 14 is a perspective view of a frustoconical blank.

In one exemplary method, the turbine blade can be formed starting with a conical or frustoconical blank 82 having the desired wall thickness and the desired length, such as that shown in FIG. 14. The blank in this method differs from the blank described in the previous method in that one end of the blank has a smaller diameter than the other end, but the blanks described in both methods have circular cross-sections throughout their respective lengths. The frustoconical blank may be useful to form turbine blades that are tapered along their length, such as those shown in FIGS. 2 and 3 and may also serve to reduce scrap or eliminate scrap and the welding and trimming steps along the trailing edge of the blade as described in the previous method. For example, the frustoconical blank 82 may be shaped into a preform, as described in the previous method. But the lengthwise edges of the preform in this case correspond to the leading and trailing edges 22, 24 of the finally formed blade shown in FIG. 4. The remainder of the process steps may remain the same as in the previous method that uses the tubular blank.

As with whatever shape blank, the blank can be made of different materials rather than just one, uniform material. For example, the blank could be formed with portions having different thickness (continually variable, stepped or otherwise), different material specifications (e.g. mild steel and ultra-high strength steel), or different material types (e.g. carbon steel, stainless steel and/or aluminum). Of course, the examples given are exemplary and not fully inclusive of all possibilities or otherwise limiting.

Various types of hydroforming processes may be employed during the hydroforming steps in the described methods. An exemplary type of hydroforming process is a pressure-sequence hydroforming process. In pressure sequence hydroforming, the preform 80, or a non-preformed blank in some cases, is placed in a hydroforming machine between first and second die halves. The ends of the preform or blank can then be sealed, and an internal hydraulic pressure (e.g., 1000 psi) can be applied inside the preform or blank. The die halves may be progressively closed, and the preform or blank is progressively formed accordingly. During this stage of the pressure-sequence hydroforming process, the applied internal hydraulic pressure is sufficiently low such that the hydraulic pressure does not subject the blank or preform to forces that exceed the yield strength of the blank or preform material. Rather, the internal pressure is applied at a level sufficient to allow the hydraulic fluid to act as a mandrel to inhibit collapse or unintentional movement of the blank or preform as it is progressively formed. The die halves are then completely closed, and a relatively increased internal hydraulic pressure (e.g., 10,000 psi) is applied inside the preform or blank. The material of the preform or blank can then elongate to take the shape of the profile cut into the closed die halves. The die halves can then be opened and the formed blade can be removed. Other hydroforming processes may be used, such as conventional non-pressure sequence processes where a blank or preform is placed between die halves that close completely and where a one-stage high internal pressure is applied to finally form the blade. In this type of hydroforming process, the internal pressure is sufficiently high to expand and/or form the blank or preform throughout the hydroforming process. It is also possible that apertures, such as those described in particular embodiments of the mounting portion of the turbine blade, can be formed during the hydroforming step.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method of making a turbine blade, comprising the steps of:
providing a preform having a hollow cross-section;
hydroforming the preform to form a turbine blade body comprising a shell that includes a continuous hollow portion along its interior; and
providing a mounting portion attached to the body to mount the turbine blade to a hub, wherein the mounting portion is hollow and a closure is provided that extends at least partially into the mounting portion where the closure supports the mounting portion against loads provided on the mounting portion by attachment members used to connect the turbine blade to an adjacent structure for its end use.

2. The method of claim 1, wherein the step of providing a preform comprises the steps of providing a blank having a circular cross-section and forming the preform from the blank.

3. The method of claim 2, wherein the blank is tubular.

4. The method of claim 2, wherein the blank is frustoconical.

5. The method of claim 1, wherein the step of providing the mounting portion includes forming the mounting portion during the step of hydroforming and the mounting portion is formed from the same preform as the turbine blade body.

6. The method of claim 1, wherein the step of hydroforming includes pressure-sequence hydroforming wherein the fluid pressure used during the hydroforming step is not high enough to exceed the yield strength of the preform.

7. The method of claim 1, wherein the preform has a wall thickness of less than about 1.5 millimeters.

8. The method of claim 1, wherein the turbine blade body has a wall thickness ranging from about 0.5 to about 6 millimeters.

9. The method of claim 1, wherein the turbine blade body is tapered along its length.

10. The method of claim 3, further comprising the step of forming a trailing edge on the turbine blade body by removing excess material after the step of hydroforming.

11. The method of claim 1, further comprising the step of disposing a filler material in at least a portion of the continuous hollow portion.

12. The method of claim 1, further comprising the step of providing a closure at a free end of the turbine blade.

13. The method of claim 1, wherein the mounting portion includes an open end and the method further comprises the step of providing a closure at the open end.

14. The method of claim 1, further comprising the step of forming one or more apertures through the mounting portion.

15. The method of claim 1, wherein the mounting portion includes a hollow interior with opposed walls and the method further comprises the step of disposing one or more mounting supports within the hollow interior so that the mounting supports engage the opposed walls of the mounting portion.

16. A turbine blade, comprising:
a mounting portion having opposed walls, the turbine blade also including a free end, and a body extending between the mounting portion and the free end, wherein the turbine blade includes a continuous hollow interior along its entire length through the mounting portion, the body, and the free end, and a closure is provided that extends at least partially into the mounting portion, the closure engages the mounting portion within the hollow interior and the closure includes mounting supports extending between the opposed walls of the mounting portion to support clamping loads applied to the opposed walls.

17. The turbine blade of claim 16 wherein the turbine blade body is tapered along its length.

18. The turbine blade of claim 16 wherein the turbine blade body has a wall thickness ranging from about 0.5 to about 6 millimeters.

19. The turbine blade of claim 16 wherein a filler material is disposed within at least a portion of the hollow interior.

20. The turbine blade of claim 16 wherein a closure is provided at the free end.

21. A turbine blade, comprising:
a mounting portion, a free end, and a body extending between the mounting portion and the free end, wherein the turbine blade includes a continuous hollow interior along its entire length through the mounting portion, the body, and the free end, wherein a closure is provided at the free end, and wherein the closure is defined by closing a wall of the body on itself to close the free end.

* * * * *